US011870647B1

(12) United States Patent
Zhang et al.

(10) Patent No.: US 11,870,647 B1
(45) Date of Patent: Jan. 9, 2024

(54) MAPPING ON-PREMISE NETWORK NODES TO CLOUD NETWORK NODES

(71) Applicant: Amazon Technologies, Inc., Seattle, WA (US)

(72) Inventors: Jiangtao Zhang, Pleasanton, CA (US); Boyu Wang, Santa Clara, CA (US); Ramu Panayappan, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/464,602

(22) Filed: Sep. 1, 2021

(51) Int. Cl.
*H04L 41/082* (2022.01)
*H04L 41/14* (2022.01)
*H04L 41/084* (2022.01)
*H04L 41/0823* (2022.01)

(52) U.S. Cl.
CPC .......... *H04L 41/082* (2013.01); *H04L 41/084* (2013.01); *H04L 41/0823* (2013.01); *H04L 41/145* (2013.01)

(58) Field of Classification Search
CPC . H04L 41/082; H04L 41/0823; H04L 41/084; H04L 41/145
USPC ........................................................ 709/220
See application file for complete search history.

(56) References Cited

U.S. PATENT DOCUMENTS

| | | | |
|---|---|---|---|
| 9,817,732 B1 | 11/2017 | Fair | |
| 10,382,353 B1 * | 8/2019 | Krishnan | ............ G06F 3/04847 |
| 10,922,132 B1 | 2/2021 | Shiramshetti et al. | |
| 10,956,242 B1 | 3/2021 | Kumar | |
| 11,153,394 B1 * | 10/2021 | Eberlein | ................ H04L 67/148 |
| 11,385,892 B1 * | 7/2022 | Zhang | .................. G06F 16/9535 |
| 11,422,797 B1 * | 8/2022 | Zhang | ........................ G06F 8/72 |
| 2010/0250746 A1 | 9/2010 | Murase | |
| 2011/0022642 A1 | 1/2011 | deMilo et al. | |
| 2011/0239231 A1 | 9/2011 | Brown et al. | |
| 2013/0086298 A1 | 4/2013 | Alanis et al. | |
| 2014/0372617 A1 * | 12/2014 | Houyou | .................. H04L 41/12 |
| | | | 709/226 |
| 2015/0318986 A1 | 11/2015 | Novak et al. | |
| 2016/0164722 A1 | 6/2016 | Zhu et al. | |

(Continued)

OTHER PUBLICATIONS

Hardy, "Network modernization is essential for digital transformation", IBM, downloaded from <https://www.IBM.com/blogs/services/2019/12/17/network-modernization-is-essential-for-digital-transformation/#>—3 pages (Dec. 17, 2019).

*Primary Examiner* — David P Zarka
(74) *Attorney, Agent, or Firm* — Knobbe, Martens, Olson & Bear LLP

(57) ABSTRACT

A network infrastructure modernization service described herein may allow a customer to migrate the underlying network infrastructure topology and configurations of the on-premises environment onto the cloud environment. By collecting the network infrastructure configurations and/or runtime metrics, generating a network model based on the configurations and/or runtime metrics, and applying modernization rules to the network model to generate a network infrastructure template, the network infrastructure modernization service described in the present application enables the customers to be migrate their on-premises applications as well as the underlying network infrastructure onto the cloud environment.

20 Claims, 6 Drawing Sheets

(56) References Cited

U.S. PATENT DOCUMENTS

| | | |
|---|---|---|
| 2016/0378713 A1 | 12/2016 | Kaimalettu et al. |
| 2017/0177311 A1 | 6/2017 | Kaulgud et al. |
| 2017/0195267 A1 | 7/2017 | Ghafourifar et al. |
| 2018/0307522 A1 | 10/2018 | Wu et al. |
| 2019/0056966 A1 | 2/2019 | Baboval et al. |
| 2020/0322181 A1* | 10/2020 | Borle .................. H04L 12/4633 |
| 2021/0258216 A1* | 8/2021 | Janakiraman ....... H04L 41/0806 |
| 2021/0279257 A1* | 9/2021 | Orman .................. G06F 16/275 |
| 2022/0329459 A1* | 10/2022 | Sundararajan ...... H04L 12/4666 |
| 2022/0345458 A1* | 10/2022 | Kumarji ................ H04L 63/102 |

* cited by examiner

```
>> snmpset v1 -c ORARW Router .1.3.6.1.4.1.9.2.1.55.127.25.1.1 s router.cfg
```

*FIG. 3*

MAPPING ON-PREMISE NETWORK NODES TO CLOUD NETWORK NODES

BACKGROUND

Network environments have become incredibly complicated as many involve a variety of types of hardware, software, nodes, use of external systems, and the like. With the advent of cloud computing technologies, various tools that allow network components traditionally implemented in an on-premises network environment to be implemented in a cloud network environment have become available.

BRIEF DESCRIPTION OF THE DRAWINGS

FIG. 3 depicts an example command that can be used to retrieve configurations and runtime metrics of network nodes, in accordance with aspects of the present disclosure.

DETAILED DESCRIPTION

Introduction

Figure 1:
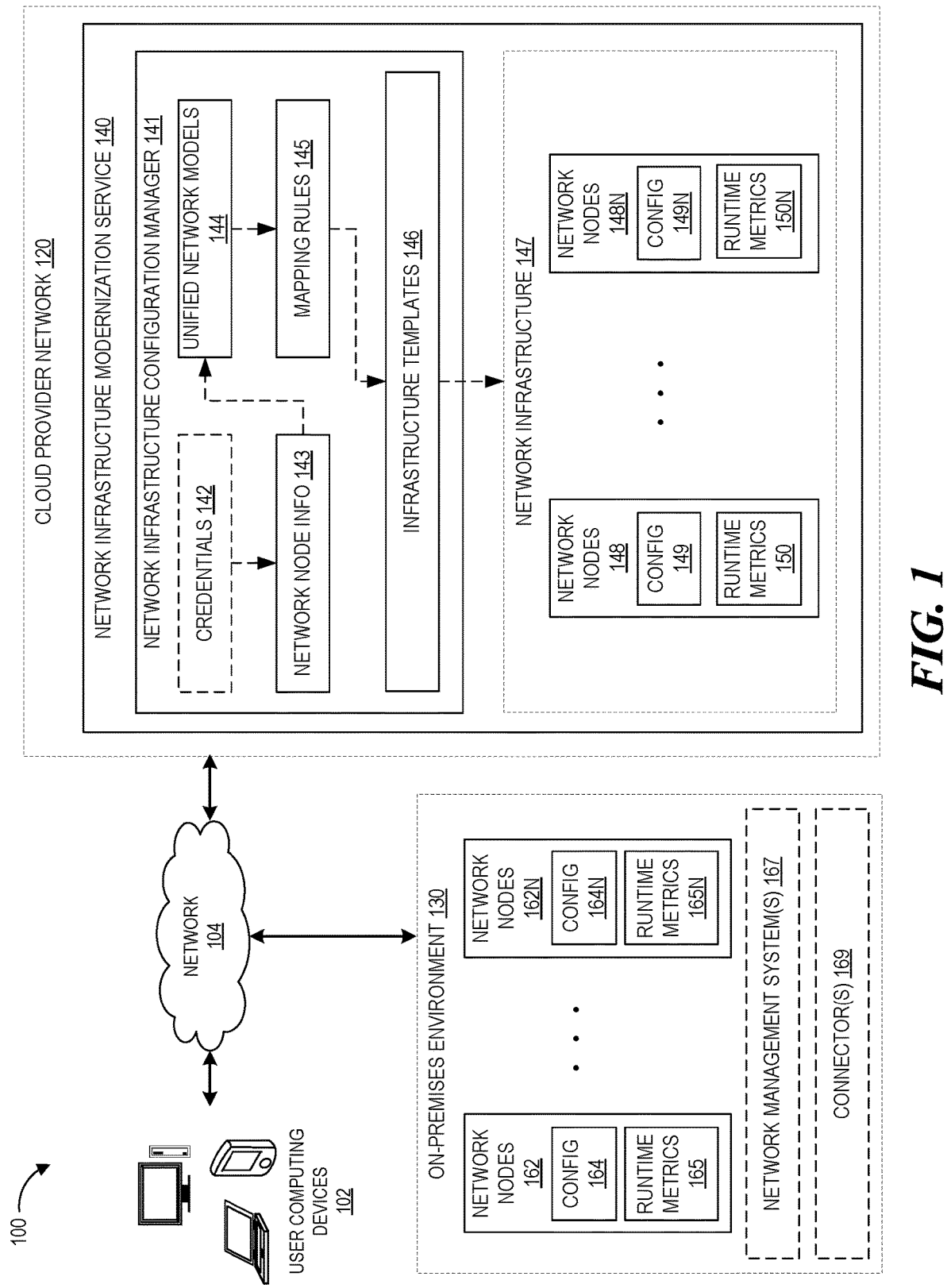
FIG. 1 depicts a diagram of a network environment in which a cloud provider network can implement a network infrastructure modernization service, in accordance with aspects of the present disclosure.

With the advent of cloud computing technologies, various modernization tools that allow network components traditionally implemented in an on-premises network environment to be implemented in a cloud network environment have become available. Existing modernization tools allow customers to migrate their applications onto the cloud environment. However, such tools typically fail to consider the network infrastructure topology and configuration of the on-premises environment, such as the security rules, routing restrictions, network interface types, network throughput, etc. of the various network nodes in the on-premises environment. This may result in degraded performance once the applications have been migrated to the cloud environment and may also require the customers to manually re-configure some of the network components in the cloud environment.

The aforementioned challenges, among others, are addressed in some embodiments by the disclosed techniques for managing network infrastructure configurations and runtime metrics, as described herein. By collecting the network infrastructure configurations and/or runtime metrics, generating a network model based on the configurations and/or runtime metrics, and applying modernization rules to the network model to generate a network infrastructure template, the network infrastructure modernization service described in the present application enables the customers to modernize their on-premises applications as well as the underlying network infrastructure onto the cloud environment.

As will be appreciated by one of skill in the art in light of the present disclosure, the embodiments disclosed herein improve the ability of computing systems, such as network systems and code execution systems, to provide mechanisms for modernizing on-premises network infrastructure onto the cloud provider network, which may result in performance improvements, cost reductions, and/or efficiency gains for the applications and servers running on the network infrastructure.

Prior techniques for migrating on-premises resources onto the cloud environment typically fail to consider the network infrastructure topology and configuration of the on-premises environment, such as the security rules, routing restrictions, network interface types, network throughput, etc. of the various network nodes in the on-premises environment. As discussed above, such approaches may result in degraded performance once the applications have been migrated to the cloud environment and may also require the customers to manually re-configure some of the network components in the cloud environment.

In contrast, embodiments of the present disclosure enables the customers to modernize their on-premises applications as well as the underlying network infrastructure onto the cloud environment, by collecting the network node information from the on-premises environment, generating a unified network model based on the network node information, and applying modernization rules to the network model to generate a network infrastructure template, which can be used to implement and configure the network infrastructure in the cloud environment. By doing so, the network infrastructure implemented in the cloud would provide a more ideal operating environment for the applications and servers running thereon, thereby potentially achieving performance improvements, cost reductions, and/or efficiency gains.

The presently disclosed embodiments therefore address technical problems inherent within computing systems and networking systems, such as migrating servers and applications, modernizing on-premises network infrastructure, and implementing network infrastructure in the cloud environment. These technical problems are addressed by the various technical solutions described herein, including generating unified network models and cloud infrastructure templates based on node information collected from the on-premises environment. Thus, the present disclosure represents an improvement on existing networking systems, and computing systems in general.

These and other aspects of the disclosure will now be described with regard to certain examples and embodiments, which are intended to illustrate but not limit the disclosure. Although the examples and embodiments described herein will focus, for the purpose of illustration, on specific calculations and algorithms, one of skill in the art will appreciate the examples are illustrate only, and are not intended to be limiting.

Overview of Example Computing Environment for Network Infrastructure Modernization Service FIG. 1 depicts a diagram of a network environment 100 in which a cloud provider network 120 can implement a network infrastructure modernization service, in accordance with aspects of the present disclosure. A cloud provider network (sometimes referred to as a cloud provider system or simply a "cloud") refers to a large pool of network-accessible computing resources (such as compute, storage, and networking resources, applications, and services), which may be virtualized (e.g., virtual machines) or bare-metal (e.g., bare-metal instances or physical machines). The cloud can provide convenient, on-demand network access to a shared pool of configurable computing resources that can be programmatically provisioned and released in response to customer commands. These resources can be dynamically provisioned and reconfigured to adjust to variable load, which provides the "elasticity" of the cloud provider network 120. Cloud computing can thus be considered as both the applications delivered as services over a publicly accessible network (e.g., the Internet, a cellular communication network) and/or the hardware and software in cloud provider data centers that provide those services. It will be appreciated that the disclosed techniques for providing network infrastructure modernization may be implemented in non-elastic computing environments as well.

The cloud provider network 120 can be accessed by user computing devices 102 over a network 104. The cloud provider network 120 may include a network infrastructure modernization service 140 and one or more other services not illustrated in FIG. 1 that are in networked communication with one another and with the network 104 to provide users with access to the services and resources provided by the cloud provider network 120.

FIG. 1 also illustrates an on-premises environment 130 that is in communication with the user computing devices 102 and the cloud provider network 120 via the network 104. The on-premises environment 130 may include physical hardware owned and/or operated by a user of the cloud provider network 120 but separate and remote from the physical hardware implementing the cloud provider network 120 or any components thereof. As shown in FIG. 1, network nodes 162-162N (which may include physical or virtual machines or other components) in the on-premises environment 130 can be configured to communicate with the network infrastructure modernization service 140 such that certain configuration and runtime information associated with the network nodes 162-162N can be accessed by the network infrastructure modernization service 140. As shown in FIG. 1, the network nodes 162 include configurations 164 that indicate how the network nodes 162 are configured and runtime metrics 165 that indicate how the network nodes 162 are performing and communicating with other network nodes 162.

In the example of FIG. 1, the network infrastructure modernization service 140 provides a network infrastructure configuration manager 141, which manages credentials 142, network node information 143, unified network models 144, mapping rules 145, and infrastructure templates 146. The credentials 142 may include user credentials, device credentials, node credentials, or network credentials needed to access or retrieve the network node information associated with the network nodes 162 in the on-premises environment 130. For example, the credentials 142 may include a set of credentials used by the network infrastructure modernization service 140 to access the network nodes 162 and retrieve the network node information associated with the network nodes 162. As another example, the credentials 142 may include a set of credentials generated by the network infrastructure modernization service 140 and provided to the network nodes 162 (or a network management system that manages the network nodes 162), where the network nodes 162 (or the network management system thereof) would use the provided set of credentials to access the network infrastructure modernization service 140 and provide the network node information associated with the network nodes 162. The network node information 143 may include information indicating how the network nodes 162 may be configured (also referred to herein as network infrastructure configurations) and/or performing and how they may be communicating with other network nodes 162 (e.g., static and dynamic workload throughput information) (also referred to herein as network infrastructure runtime metrics). As illustrated in FIG. 1, the on-premises environment 130 may optionally include network management system(s) 167 and/or connector(s) 169. The network management system 167 may monitor, update, and troubleshoot the network nodes 162. Additionally, the network management system 167 may provide the network node information 143 to the network infrastructure configuration manager 141 on behalf of the network nodes 162 (e.g., the network infrastructure configuration manager 141 may connect to the network management system 167 using the credentials 142 and request the network node information 143, or alternatively, the network management system 167 may connect to the network infrastructure configuration manager 141 using the credentials 142 and provide the network node information 143).

In some embodiments, the connector 169 may be used to provide the network node information 143 to the network infrastructure configuration manager 141. The connector 169 may be connected to the network nodes 162 (e.g., via local area network within the on-premises environment 130) that do not have internet access and thus cannot communicate directly with the network infrastructure configuration manager 141. On behalf of the network nodes 162 that are not able to directly communicate directly with the network infrastructure configuration manager 141, the connector 169 may provide the network node information 143 associated with such network nodes 162 to the network infrastructure configuration manager 141 (e.g., the network infrastructure configuration manager 141 may connect to the connector 169 using the credentials 142 and request the network node information 143, or alternatively, the connector 169 may connect to the network infrastructure configuration manager 141 using the credentials 142 and provide the network node information 143).

The unified network models 144 (also referred to herein as a network model) may be generated based on the network node information 143 collected from the on-premises environment 130 and may include one or more data structures that represent the network nodes and/or their relationships in the on-premises environment 130. For example, the network infrastructure configuration manager 141 may generate a unified network model 144 using a converter that is configured to take information (e.g., identifier, configurations 164, and/or runtime metrics 165) associated with a network node 162 as input and output a node that can be added to the unified network model. Such a converter may convert multiple different types of network nodes (e.g., network components of different vendors, versions, capacity, types, etc.) into the same unified network node if the network nodes would correspond to the same cloud network node. For example, Cisco router models A and B and Juniper router models X and Y may all be converted into the same router node R in the unified network model (and as a result be mapped to the same cloud network node in the infrastructure templates 146 and in the network infrastructure 147). In some embodiments, the network nodes 162 are converted into the nodes in the unified network model 144 in a one-to-one manner. In some embodiments, the network nodes 162 are converted into the nodes in the unified network model 144 in a multi-to-multi manner. In some embodiments, the network nodes 162 are converted into the nodes in the unified network model 144 in a combination of a one-to-one manner, a multi-to-one manner, a one-to-multi manner, and/or a multi-to-multi manner.

The mapping rules 145 (also referred to herein as modernization rules) may include rules that can be used to identify, based on the unified network model 144, cloud network components that can be used to implement the network infrastructure in the on-premises environment 130. The infrastructure templates 146 may include information that can be used to set up and configure a plurality of cloud network nodes or components that can be used to implement the network infrastructure associated with the on-premises network environment of the user and any relationships and/or restrictions associated with the cloud network nodes (e.g., AWS CloudFormation templates). In some embodiments, the infrastructure templates 146 include the configurations 149. In other embodiments, the infrastructure templates 146 include information that can be used to configure the network nodes 148 such that the network nodes 148 have the configurations 149. As shown in FIG. 1, the credentials 142 may be used to obtain the network node information 143, which can be used to generate the unified network model 144, which can be used along with the mapping rules 145 to generate the infrastructure template 146, which can then be used to implement the network infrastructure 147.

The network infrastructure modernization service 140 also provides network infrastructure 147, which includes network nodes 148-148N that are used to implement the network infrastructure implemented by the network nodes 162-162N. The network infrastructure 147 may be a "cloud" counterpart to the network infrastructure implemented in the on-premises environment 130 according to the techniques described herein. For example, the network infrastructure modernization service 140 may, upon determining that the on-premises environment 130 to be modernized includes a physical router, may select one of the virtual network routers available on the cloud provider network 120, transform the firewall rules of the physical router into cloud security groups usable by the virtual router, and recommend network architecture changes to avoid bottlenecks (e.g., situations where the runtime metrics 165 of a network node 162 indicate that it needs more connections or throughput than one of the virtual network interfaces or virtual network interface cards can provide).

A cloud security group may act as a virtual firewall for the network node to control inbound and outbound traffic. When a network node such as a virtual router or an instance is launched in the cloud network provider 120 (e.g., in a virtual private cloud or VPC), one or more security groups can be assigned to the network node. In some embodiments, the security groups operate at the network node level (e.g., as opposed to the subnet level). In such embodiments, each network node in a subnet can be assigned to a different set of security groups. In other embodiments, the security groups operate at the subnet level, and each subnet can be assigned to a different set of security groups. If a network node is launched without a security group specified, a default security group may be assigned. Each security group may have a set of rules that control the inbound traffic to instances, and a separate set of rules that control the outbound traffic. In some embodiments, the network infrastructure modernization service 140 may set up network access control lists (ACLs) with rules similar to the security groups in order to add an additional layer of security to the VPC in which the network node is launched.

In some embodiments, the network nodes 148-148N include the same number of components as the network nodes 162-162N. In other embodiments, the network nodes 148-148N include a different number of components than the network nodes 162-162N. The network nodes 148-148N and 162-162N may comprise network devices such as computing devices, routers, switches, gateways, load balancers, and the like, which may be implemented as hardware components and/or software components. As shown in FIG. 1, the network nodes 148 include configurations 149 that indicate how the network nodes 148 are configured and runtime metrics 150 that indicate how the network nodes 148 are performing and communicating with other network nodes 148. For example, the configurations 149 of a network node 148 may include security rules, routing restrictions (e.g., restrictions on traffic into and out of the network node), network protocols, network interface types, network throughputs, port numbers, Internet access rules, redundancy rules, Quality of Service (QoS) configurations, or media access control (MAC) addresses, and the like. Although FIG. 1 shows only the network infrastructure 147 corresponding to the on-premises environment 130, the cloud provider network 120 may include additional sets of network infrastructure that correspond to other users and/or on-premises environments.

The network infrastructure configuration manager 141 may collect network node information from the network nodes 162, generate a network model including one or more cloud network nodes 148, generate a cloud infrastructure template 146 for implementing the network model on the cloud provider network 120, and deploy the network infrastructure including one or more network nodes and one or more user applications. The operations of the network infrastructure configuration manager 141 are described in greater detail below with reference to FIGS. 2-5.

Although not illustrated in FIG. 1, the network nodes 148 and/or 162 may include one or more servers or applications running there on. The applications running on the network nodes 148 may have been migrated from the on-premises environment 130 (e.g., applications configured to perform the same or similar tasks as those previously running on the network nodes 162 in the on-premises environment 130). Further details regarding migrating one or more servers and/or applications from the on-premises environment 130 to the cloud provider network 120 can be found within U.S. Pat. No. 10,922,132, entitled "SECURE MIGRATION OF SERVERS FROM CUSTOMER NETWORKS TO SERVICE PROVIDER SYSTEMS" and filed Dec. 11, 2017, and U.S. Pat. No. 10,956,242, entitled "AUTOMATING THE MIGRATION OF WEB SERVICE IMPLEMENTATIONS TO A SERVICE PROVIDER SYSTEM" and filed Dec. 6, 2017, the disclosures of which are hereby incorporated by reference in their entirety.

In some embodiments, the network nodes 148 may be implemented on one or more instances (also referred to as compute instances, virtual or physical machine instances, or virtual or physical machines) provided by the cloud provider network 120 with varying computational and/or memory resources. In one embodiment, each of the instances may correspond to one of several instance types or families. An instance type may be characterized by its hardware type, computational resources (e.g., number, type, and configuration of central processing units [CPUs] or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Each instance type can have a specific ratio of processing, local storage, memory, and networking resources, and different instance families may have differing types of these resources as well. Multiple sizes of these resource configurations can be available within a given instance type. The instances may include one or more of physical machines, virtual machines, containers, or other forms of virtual or physical compute units that are configured to execute one or more applications.

In some implementations, at least a subset of virtualization management tasks may be performed at one or more offloading cards so as to enable more of the processing capacity of the host to be dedicated to client-requested compute instances, e.g., cards connected via Peripheral Component Interconnect (PCI) or Peripheral Component Interconnect Express (PCIe) to the physical CPUs and other components of the virtualization host may be used for some virtualization management components. Such an offload card of the host can include one or more CPUs and/or other computing resources that are not available to customer instances, but rather are dedicated to instance management tasks such as virtual machine management, input/output virtualization to network-attached storage volumes, local migration management tasks, instance health monitoring, and the like. Alternatively or additionally, such an offload card may provide additional computing resources usable by customer instances.

As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client.

The network infrastructure management service 140 may provide a set of application programming interfaces ("APIs") that can be used by the users of the user computing devices 102 to request assessment of their on-premises network infrastructure, cause the infrastructure and/or applications to be implemented on the cloud provider network 120, and/or modify their cloud network infrastructure. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another.

A container, as referred to herein, packages up code and all its dependencies so an application (also referred to as a task, pod, or cluster in various container platforms) can run quickly and reliably from one computing environment to another. A container image is a standalone, executable package of software that includes everything needed to run an application process: code, runtime, system tools, system libraries and settings. Container images become containers at runtime. Containers are thus an abstraction of the application layer (meaning that each container simulates a different software application process). Though each container runs isolated processes, multiple containers can share a common operating system, for example, by being launched within the same virtual machine. In contrast, virtual machines are an abstraction of the hardware layer (meaning that each virtual machine simulates a physical machine that can run software). Virtual machine technology can use one physical server to run the equivalent of many servers (each of which is called a virtual machine). While multiple virtual machines can run on one physical machine, each virtual machine typically has its own copy of an operating system, as well as the applications and their related files, libraries, and dependencies. Virtual machines are commonly referred to as compute instances or simply "instances." Some containers can be run on instances that are running a container agent, and some containers can be run on bare-metal servers.

In the context of some software container services, a task refers to a container, or multiple containers working together, running to execute the functionality of a software application or a particular component of that application. A cluster refers to a logical grouping of tasks. In some implementations, tasks can also include virtual machines, for example, virtual machines running within instance(s) hosting the container(s). A task definition can enable container images to be run in a cloud provider network to execute a task. A task definition can specify parameters including which container image to use with each container in the task, interactions between containers, constraints on container placement within a cloud provider network, what quantities of different hardware resources should be allocated to the task or to specific containers, networking modes, logging configurations, persistent storage that should be used with the containers in the task, and whether the task continues to run if a container finishes or fails. Multiple containers can be grouped into the same task definition, for example, linked containers that must be run together to execute related processes of an application, containers that share resources, or containers that are required to be run on the same underlying host. An entire application stack can span multiple task definitions by separating different components of the application into their own task definitions. An application can be defined using a service definition, which can specify configuration parameters that define the service including which task definition(s) to use, how many instantiations of each task to run, and how the tasks should be load balanced.

In some implementations, customers of the cloud provider network 120 can deploy containers by managing clusters of compute instances that run container agents. As described herein, such compute instances can be implemented within the cloud provider network 120 or within the on-premises environment 130, and a cluster may include one or both types of such compute instances. In such implementations, customers manage scaling, monitoring, patching, and security of the compute instances, in addition to managing their containerized workload. In some implementations, customers of a cloud provider may deploy and scale containerized workloads automatically without having to manage the underlying computing resources, for example, via a container management service that receives information from a customer about their workload and then automatically selects the appropriate compute resources to run the workload. Beneficially, such a "serverless container" approach abstracts away the underlying infrastructure, enabling the customer to simply focus on their containerized application, by managing clusters of compute instances on behalf of the customer.

The traffic and operations of the cloud provider network 120 may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information, etc.). The data plane includes customer resources that are implemented on the cloud provider network (e.g., computing instances, containers, block storage volumes, databases, file storage, etc.). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

Some implementations of the cloud provider network 120 can additionally include compute servers, object storage servers, block store servers, domain name services ("DNS") servers, relational database servers, file system servers, message queuing servers, logging servers, and other server configurations (not illustrated) for supporting on-demand cloud computing platforms. Each server (or service illustrated in FIG. 1) includes hardware computer memory and/or processors, an operating system that provides executable program instructions for the general administration and operation of that server, and a computer-readable medium storing instructions that, when executed by a processor of the server, allow the server to perform its intended functions.

The cloud provider network 120 can be formed as a number of regions, where a region is a separate geographical area in which the cloud provider clusters data centers. Each region can include two or more availability zones connected to one another via a private high-speed network, for example, a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs are the primary backbone locations linking customers to the cloud provider network, and may be collocated at other network provider facilities (e.g., Internet service providers, telecommunications providers) and securely connected (e.g., via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low latency resource access to customers on a global scale with a high degree of fault tolerance and stability.

With cloud computing, instead of buying, owning, and maintaining their own data centers and servers, organizations can acquire technology such as compute power, storage, databases, and other services on an as-needed basis. The cloud provider network 120 can provide on-demand, scalable computing platforms to users through the network 104, for example, allowing users to have at their disposal scalable "virtual computing devices" via their use of the clusters, instances, and/or containers described herein. These virtual computing devices have attributes of a personal computing device including hardware (various types of processors, local memory, random access memory ("RAM"), hard-disk and/or solid-state drive ("SSD") storage), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their customers or clients.

As illustrated in FIG. 1, the cloud provider network 120 can communicate over network 104 with user computing devices 102. The network 104 can include any appropriate network, including an intranet, the Internet, a cellular network, a local area network, a global area network, a public network, a private network, or any other such network or combination thereof. In the illustrated embodiment, the network 104 is the Internet. Protocols and components for communicating via the Internet or any of the other aforementioned types of communication networks are known to those skilled in the art of computer communications and thus, need not be described in more detail herein. The user computing devices 102 can include any network-equipped computing device, for example, desktop computers, laptops, smartphones, tablets, e-readers, gaming consoles, and the like. Users can access the cloud provider network 120 via the network 104 to view or manage their data and computing resources, as well as to use websites and/or applications hosted by the cloud provider network 120.

The cloud provider network 120 may implement various computing resources or services, which may include a compute service (referred to in various implementations as an elastic compute service, a virtual machines service, a computing cloud service, a compute engine, or a cloud compute service), a container orchestration and management service (referred to in various implementations as a container service, cloud container service, container engine, or container cloud service), a Kubernetes-based container orchestration and management service (referred to in various implementations as a container service for Kubernetes, Azure Kubernetes service, IBM cloud Kubernetes service, Kubernetes engine, or container engine for Kubernetes), data processing service(s) (e.g., map reduce, data flow, and/or other large scale data processing techniques), data storage services (e.g., object storage services, block-based storage services, or data warehouse storage services), file system services, message queuing services, logging services, and/or any other type of network based services (which may include various other types of storage, processing, analysis, communication, event handling, visualization, and security services not illustrated). The resources required to support the operations of such services (e.g., compute and storage resources) may be provisioned in an account (or across multiple accounts) associated with the cloud provider network 120, in contrast to resources requested by users of the cloud provider network 120, which may be provisioned in one or more user accounts.

Example Routine for Forwarding a Network Packet to the Destination

Figure 2:
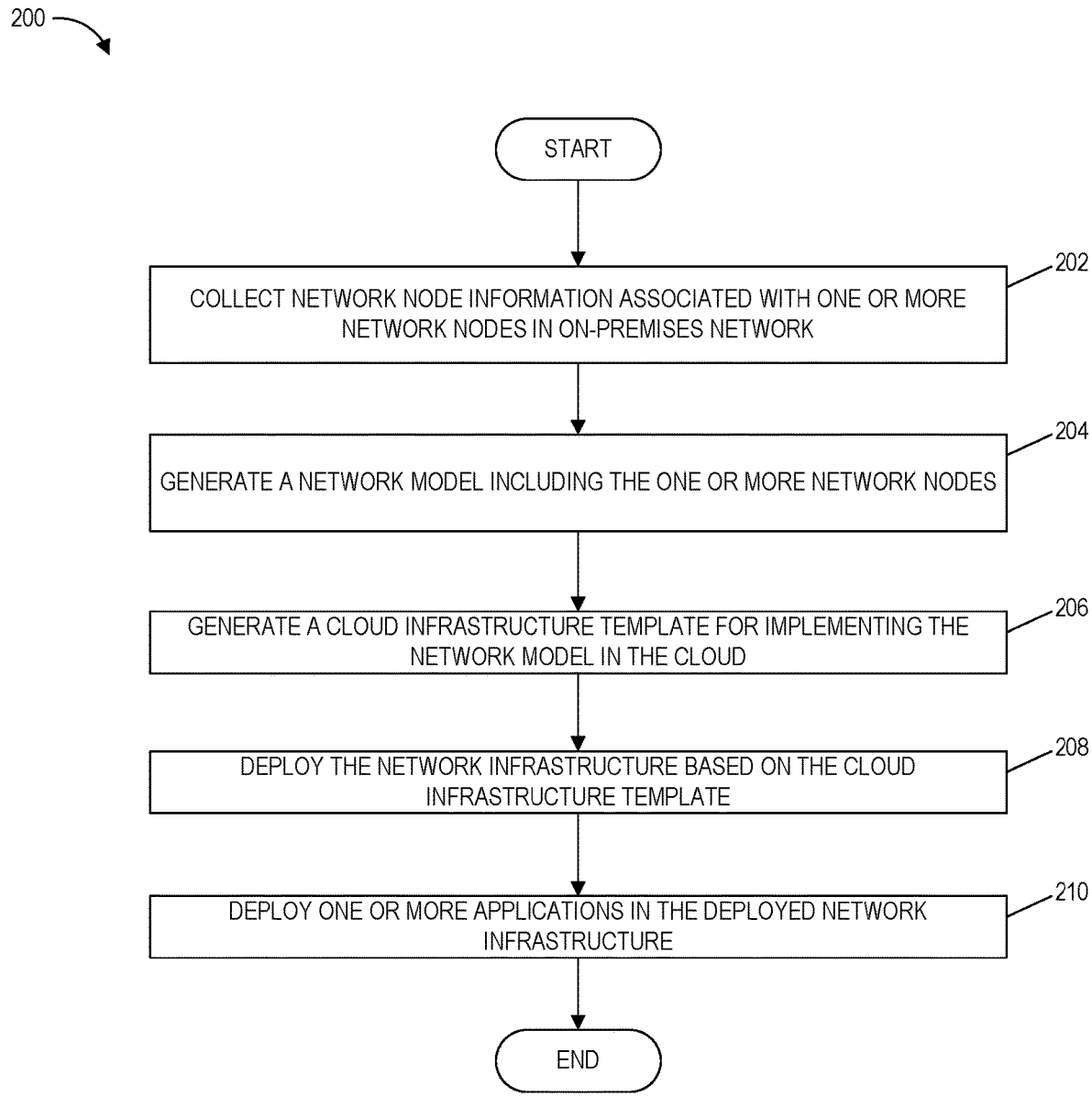
FIG. 2 depicts an illustrative routine for managing network infrastructure configurations and runtime metrics, in accordance with aspects of the present disclosure.

FIG. 2 depicts an illustrative routine for managing network infrastructure configurations and runtime metrics, in accordance with aspects of the present disclosure. The routine 200 may be carried out, for example, by the network infrastructure modernization service 140 shown in FIG. 1. For convenience, the steps of the routine 200 are described as being performed by the network infrastructure modernization service 140. For example, the components of the network infrastructure modernization service 140 may include one or more hardware computing devices and non-transitory physical computer storage storing instructions that, when executed by the one or more hardware computing devices, cause the one or more hardware computing devices to perform the steps of the routine 200.

The routine 200 begins at block 202, where the network infrastructure modernization service 140 collects network node information (e.g., configurations and runtime metrics) associated with one or more network nodes in an on-premises network environment of a user. For example, the network infrastructure modernization service 140 may use the credentials 142 to access or request the network node information from the on-premises environment 130. Alternatively, the network infrastructure modernization service 140 may provide the credentials 142 to a component in the on-premises environment 130 (e.g., network node 162, network management system 167, or connector 169) so that the component can connect to the network infrastructure modernization service 140 using the credentials 142 and provide the network node information to the network infrastructure modernization service 140.

Figure 4:
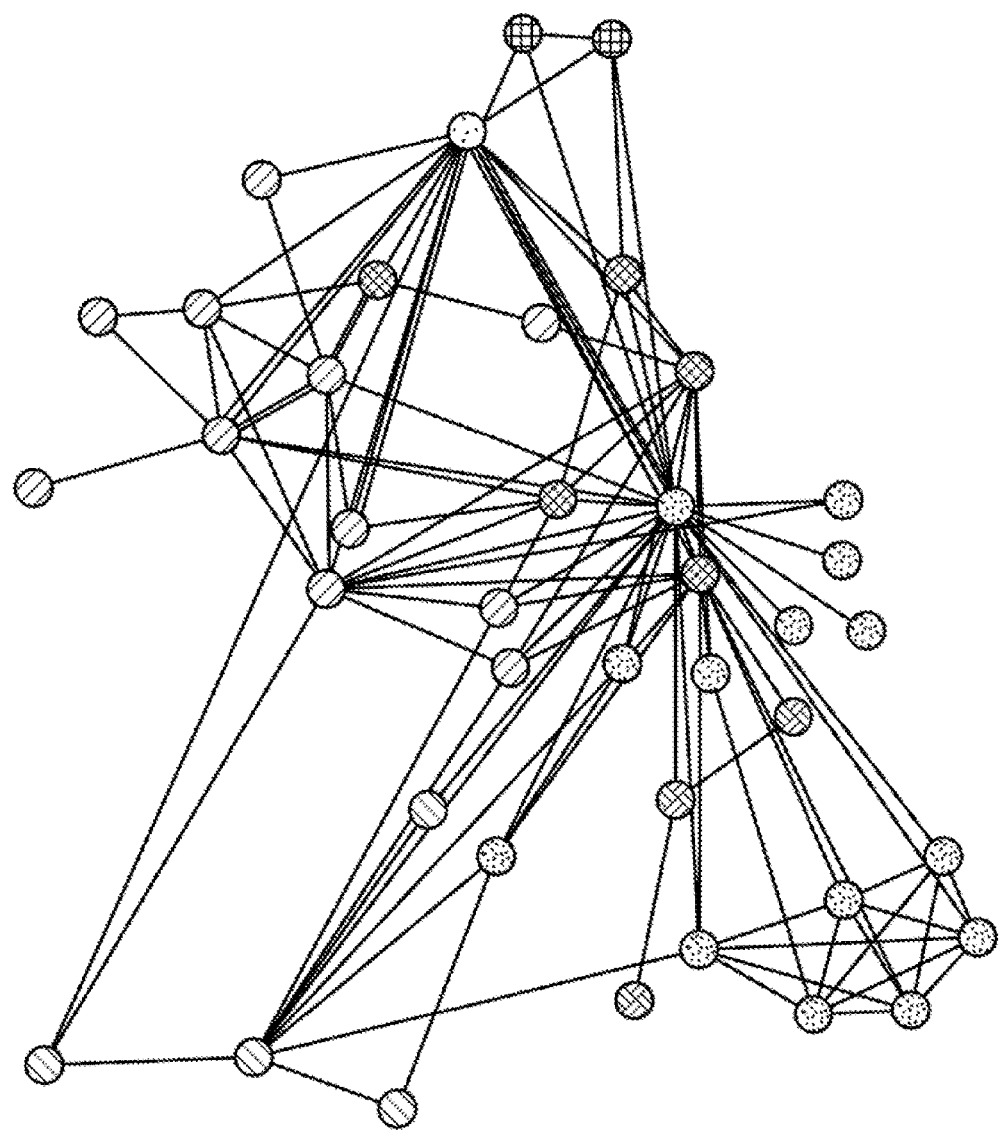
FIG. 4 depicts an illustrative graph visually indicating the configurations of the various network nodes, in accordance with aspects of the present disclosure.

At block 204, the network infrastructure modernization service 140 generates a network model (e.g., unified network model 144) including the one or more network nodes in the on-premises network environment of the user. For example, the network infrastructure modernization service 140 may analyze the collected network node information, correlate the network nodes based on their running configurations and/or runtime metrics, form a graph database, where each node in the graph represents a network node (e.g., switch, router, server, etc.), the edge in the graph stands for the communication channel. An example of such a graph is shown in FIG. 4. Within each node, configuration information, security rules, Quality of Service (QoS) policies, etc. associated with the corresponding network node may be embedded for the user to view and/or modify. Within each edge, the communication protocol, throughput, channel type (VLAN, VXLAN, L2TP, etc.), etc. maybe embedded for the user to view and/or modify.

At block 206, the network infrastructure modernization service 140 generates a cloud infrastructure template for implementing the network model in the cloud provider network 120. For example, the cloud infrastructure template may include a plurality of cloud network nodes or components that can be used to implement the network infrastructure associated with the on-premises network environment of the user and any configurations, relationships, and/or restrictions associated with the cloud network nodes. The plurality of cloud network nodes or components may be identified using the information associated with the one or more network nodes included in the network model (e.g., those in the on-premises environment). For example, the network infrastructure modernization service 140 may, using the mapping rules 145, identify the plurality of cloud network nodes or components that can be used to mirror or implement the network infrastructure in the on-premises environment. The mapping rules 145 may indicate, for each of a plurality of known hardware and/or software network nodes or components (or each combination of such nodes or components) that may be encountered by the network infrastructure modernization service 140, one or more corresponding network nodes or components that may be used to implement the node(s) or component(s) in the cloud provider network 120. In some cases, the mapping may be vendor-specific, size-specific, and/or version-specific. For example, the mapping rules 145 may map on-premises network nodes or components of different vendors or manufactures to different cloud network nodes or components, map on-premises network nodes or components of different size or capacity to different cloud network nodes or components, and/or map on-premises network nodes or components of different versions or model numbers to different cloud network nodes or components. In some embodiments, two on-premises network nodes or components of the same type, size, model, vendor, etc. may be mapped to two different cloud network nodes or components based on the two on-premises network nodes or components having different runtime metrics or different manner/level of usage. In some embodiments, the mapping rules 145 are vendor-agnostic and are configured to map unified network nodes in the unified network model to corresponding cloud network nodes.

At block 208, the network infrastructure modernization service 140 deploys the network infrastructure based on the cloud infrastructure template. In some cases, the network infrastructure modernization service 140 may cause the template to be output to the user so that the user can modify the template as needed. Once the template has been approved, the network infrastructure modernization service 140 may deploy the network infrastructure.

At block 210, the network infrastructure modernization service 140 deploys one or more applications in the deployed network infrastructure. For example, the one or more applications may correspond to one or more user applications executing in the on-premises network environment of the user. The routine 200 may then end.

The routine 200 can include fewer, more, or different blocks than those illustrated in FIG. 2 and/or one or more blocks illustrated in FIG. 2 may be modified, omitted, or switched without departing from the spirit and scope of the description. Moreover, it will be appreciated by those skilled in the art and others that some or all of the functions described in this disclosure may be embodied in software executed by one or more processors of the cloud provider network 120 and/or the client computing device 102 disclosed herein.

Example Command for Retrieving Network Infrastructure Configurations and Runtime Metrics FIG. 3 depicts an example command 300 that can be used to retrieve configurations of network nodes, in accordance with aspects of the present disclosure. For example, the network infrastructure configuration manager 141 may use the illustrated command to instruct a network node in the on-premises environment 130 to send its running network node information (e.g., the current configuration file associated with the network node, the runtime metrics associated with the network node, etc.) to a specific destination (e.g., "router.cfg"). The network node information may include, among other things, the static and dynamic workload throughput of the network node.

For a network with a network management system (NMS) deployed, or for a router/switch has a web service available, or for a software-defined network (SDN), there is an SDN controller system such as OpenDaylight available. In such a case, the network infrastructure configuration manager 141 can connect through a Web REST API to retrieve the network node information associated with the network node. For a managed environment such as VMware vCenter or Hyper-V, their vendor-specific API may be used to retrieve the network node information associated with the network node.

Illustrative Graph for Visualizing Network Nodes

FIG. 4 depicts an illustrative graph 400 visually indicating the configurations of the various network nodes, in accordance with aspects of the present disclosure. For example, the illustrated graph may be provided to the user via the service console associated with the network infrastructure configuration manager 141. The graph provides an overview of the user's on-premises network architecture and configurations. Alternatively, in some embodiments, the graph provides an overview of the proposed cloud network architecture and configurations intended to mirror/implement the network architecture and configurations in the on-premises environment 130 of the user. In the example of FIG. 4, each circle represents a network node in the network architecture and each line represents a communication channel between two network nodes. Network nodes having the same shading in FIG. 4 represent that the network nodes share the same routing domain.

Figure 5:
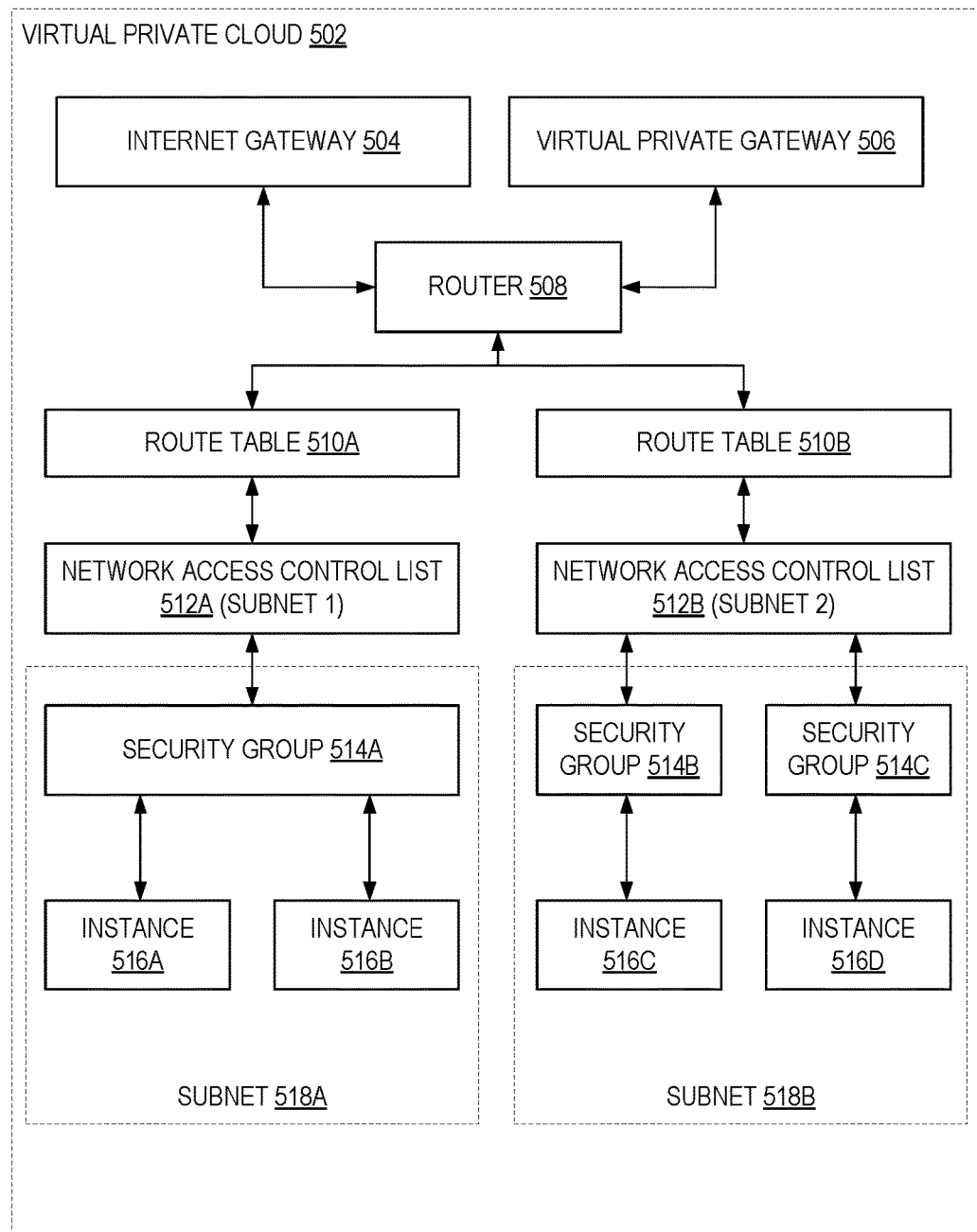
FIG. 5 depicts an illustrative network infrastructure generated based on the network information retrieved from the network nodes of the on-premises network environment, in accordance with aspects of the present disclosure.

Illustrative Network Infrastructure Based on Network Information from User Network Nodes FIG. 5 depicts an illustrative network infrastructure generated based on the network information retrieved from the network nodes of the on-premises network environment, in accordance with aspects of the present disclosure.

The modernization techniques described herein can be used to improve or optimize an on-premises network infrastructure and/or a cloud network infrastructure of the user. For example, the network infrastructure configuration manager 141 may generate a network model using the existing on-premises network nodes. The network model can be defined as ontology RDF models or any other type of graph models. For example, the network model can be a graph-based database. The network model may include one or more network nodes and any relationships and/or restrictions governing the network nodes. For example, the network model may include VPC, routing table, ACL rules, security group, DNS, certificate, Internet gateway, load balancer, transit gateway connecting different VPC networks, maximum transmission unit (MTU), virtual interface (VLAN), border gateway protocol (BGP) peer, LAG basic ontologies. Each ontology has its own attributes, which is edges. These basic ontologies are interconnected to each other.

The network infrastructure configuration manager 141 may access one or more network optimization rules defined in RDF models to generate improved or optimized network configurations (e.g., rules used to identify bottlenecks in the existing network nodes, spot security issues, recommend a more advanced configuration or architecture, etc.), generate the optimized configurations, display on the topology graph on the service console associated with the network infrastructure configuration manager 141. Additionally, network infrastructure configuration manager 141 may translate the on-premises network infrastructure to a best practice cloud native network infrastructure template (e.g., a template that defines the cloud network nodes and their relationship and restrictions) using one or more translation and/or mapping rules.

The virtual private cloud 502 may include, among other things, one or more of the following network objects: (1) A Virtual Private Cloud: A logically isolated virtual network in the cloud provider network 120. A VPC's IP address space can be selected by the user of the VPC from the ranges selected by the user. (2) Subnet: A segment of a VPC's IP address range where groups of isolated resources can be placed. (3) Internet Gateway (e.g., Internet gateway 504): The cloud VPC side of a connection to the public Internet. (4) NAT Gateway: A highly available, managed Network Address Translation (NAT) service for user resources in a private subnet to access the Internet. (5) Virtual private gateway (e.g., virtual private gateway 506): The cloud VPC side of a VPN connection. (6) Peering Connection: A peering connection enables the user to route traffic via private IP addresses between two peered VPCs. (7) VPC Endpoints: Enables private connectivity to services hosted in the cloud provider network 120, from within the user's VPC without using an Internet Gateway, VPN, Network Address Translation (NAT) devices, or firewall proxies. (8) Egress-only Internet Gateway: A stateful gateway to provide egress only access for IPv6 traffic from the VPC to the Internet. In the example of FIG. 5, the security groups 514A and 514B represent the firewalls associated with the instances 516A, 516B, 516C, and 516D, and the network access control lists 512A and 512B represent the firewalls associated with the subnets 518A and 518B.

In some embodiments, there may be more than 1 VPC. This is generally used as a way to add an additional level of separation between environments, rather than just using different subnets. For example, a proposed cloud network infrastructure may have 1 VPC for production environments, 1 VPC for testing and staging environments, 1 VPC for development environments, and 1 VPC for management services, which will be leveraged by all of the other VPCs. The NAT gateway (NGW) may be placed in a public subnet within the VPC and given a public IP address. This allows the NGW to connect through the internet gateway to the public internet and translate the private addresses of the resources in the private subnets into a public address that can be used to connect to the outside internet. For example, in order to allow this type of connectivity, the route table associated with each subnet may have a route defined with the Destination Classless inter-domain routing (CIDR) as: 0.0.0.0/0, and a Target of: ngw-########, which will be the ID of the NAT gateway. Additionally, each VPC may have a VPC router. The primary function of this VPC router is to take all of the route tables defined within that VPC, and then direct the traffic flow within that VPC, as well as to subnets outside of the VPC, based on the rules defined within those tables.

Example Architecture of Computing System

Figure 6:
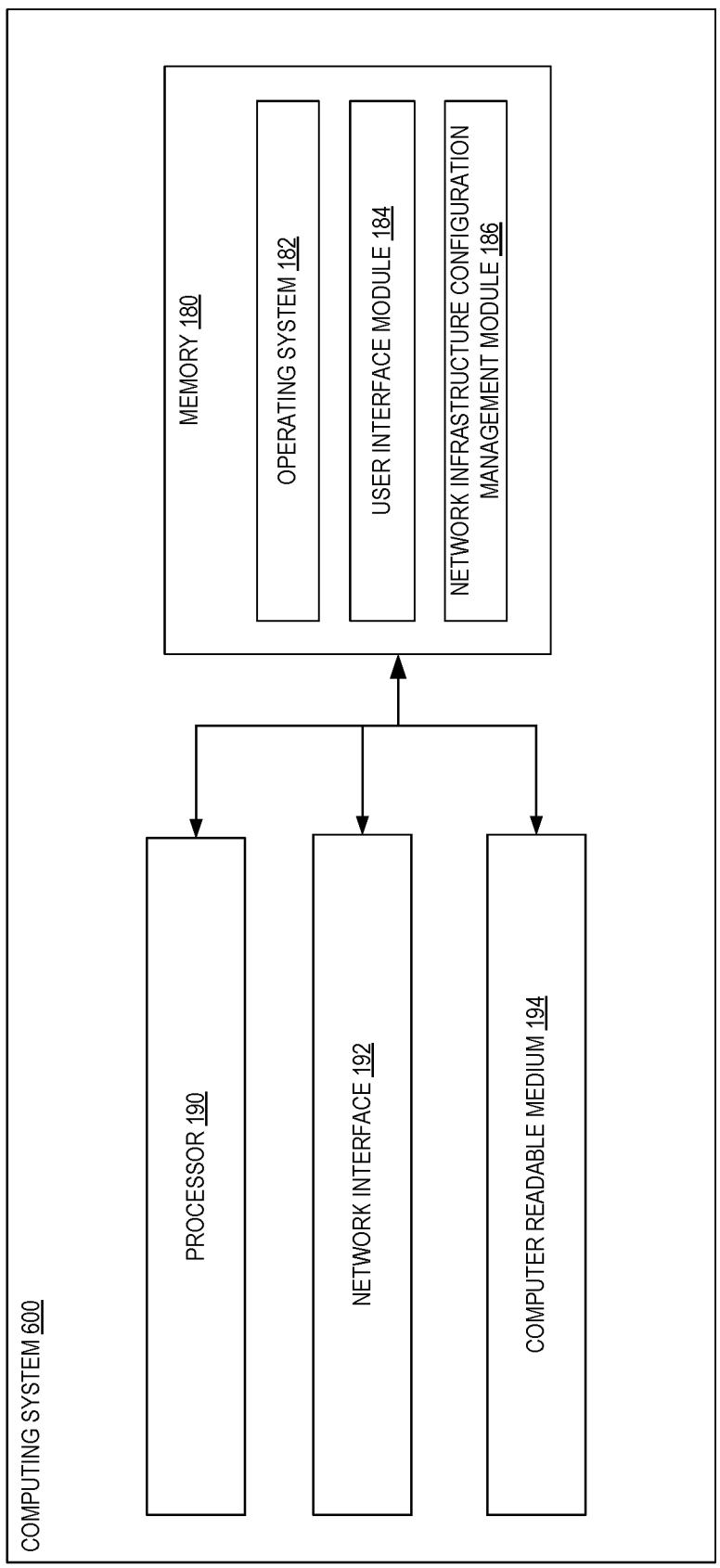
FIG. 6 depicts a general architecture of a computing device or system that can perform one or more of the network infrastructure modernization techniques, in accordance with aspects of the present disclosure.

FIG. 6 depicts an example architecture of a computing system 600 that can be used to perform one or more of the techniques described herein or illustrated in FIGS. 1-5. The general architecture of the computing system 600 depicted in FIG. 6 includes an arrangement of computer hardware and software modules that may be used to implement one or more aspects of the present disclosure. The computing system 600 may include many more (or fewer) elements than those shown in FIG. 6. It is not necessary, however, that all of these elements be shown in order to provide an enabling disclosure. For example, the computing system 600 may be used to implement one or more of the elements described herein, including the network infrastructure modernization service 140 and/or the user computing devices 102.

As illustrated, the computing system 600 includes a processor 190, a network interface 192, and a computer-readable medium 194, all of which may communicate with one another by way of a communication bus. The network interface 192 may provide connectivity to one or more networks or computing systems. The processor 190 may thus receive information and instructions from other computing systems or services via the network 104 illustrated in FIG. 1.

The processor 190 may also communicate with memory 180. The memory 180 may contain computer program instructions (grouped as modules in some embodiments) that the processor 190 executes in order to implement one or more aspects of the present disclosure. The memory 180 may include RAM, ROM, and/or other persistent, auxiliary, or non-transitory computer-readable media. The memory 180 may store an operating system 182 that provides computer program instructions for use by the processor 190 in the general administration and operation of the computing system 600. The memory 180 may further include computer program instructions and other information for implementing one or more aspects of the present disclosure. For example, in one embodiment, the memory 180 includes a user interface module 184 that generates user interfaces (and/or instructions therefor) for display upon a user computing device (e.g., user computing device 102 of FIG. 1), e.g., via a navigation and/or browsing interface such as a browser or application installed on the user computing device. In addition, the memory 180 may include or communicate with one or more data stores.

In addition to and/or in combination with the user interface module 184, the memory 180 may include a network infrastructure configuration management module 186 that may be executed by the processor 190. In one embodiment, the network infrastructure configuration management module 186 implements various aspects of the present disclosure, e.g., those illustrated in FIGS. 1-6 or described with reference to FIGS. 1-6.

Although a single processor, a single network interface, a single computer-readable medium, and a single memory are illustrated in the example of FIG. 6, in other implementations, the computing system 600 can have a multiple of one or more of these components (e.g., two or more processors and/or two or more memories).

Enumerated Implementations (EIs)

Some examples of enumerated implementations (EIs) are provided in this section, without limitation.

EI 1: A system comprising: a compute service implemented at least partially by a set of physical machines comprising compute capacity configured for hosting a plurality of compute instances usable to execute user applications; and a network infrastructure modernization service comprising computer hardware and in network communication with one or more network nodes of an on-premises network environment associated with a user, wherein the network infrastructure modernization service is configured to at least: receive, from a user computing device associated with the user, a set of node credentials usable to access the one or more network nodes of the on-premises network environment associated with the user; access, using the set of node credentials, network node information associated with the one or more network nodes of the on-premises network environment associated with the user; generate a network model including the one or more network nodes of the on-premises network environment associated with the user; generate, using one or more modernization rules, a cloud infrastructure template including one or more cloud network nodes that correspond to the one or more network nodes of the on-premises network environment associated with the user; and deploy, in the compute service, a cloud network infrastructure associated with the user according to the cloud infrastructure template.

EI 2: The system of EI 1, wherein the network infrastructure modernization service is further configured to output a visual representation of the cloud infrastructure template for user review and modification.

EI 3: The system of EI 1, wherein the network infrastructure modernization service is further configured to deploy the cloud network infrastructure based at least in part on a version of the cloud infrastructure template that has been modified by the user.

EI 4: The system of EI 1, wherein the network infrastructure modernization service is further configured to cause one or more of the user applications to be migrated onto the cloud network infrastructure.

EI 5: A computer implemented method comprising: receiving network node information associated with one or more network nodes of an on-premises network environment associated with a user; generating a network model including the one or more network nodes of the on premises network environment associated with the user; generating, using one or more modernization rules, cloud infrastructure information indicating one or more cloud network nodes that correspond to the one or more network nodes of the on-premises network environment associated with the user, wherein the one or more modernization rules include mapping information usable to map the one or more network nodes of the on-premises network environment to the one or more corresponding cloud network nodes; and deploying a cloud network infrastructure associated with the user based at least in part on the cloud infrastructure information.

EI 6: The method of EI 5, further comprising: receiving, from a user computing device associated with the user, a set of credentials usable to access the one or more network nodes of the on-premises network environment associated with the user or a network management system associated with the one or more network nodes of the on-premises network environment associated with the user; and using the set of credentials, requesting the network node information from the one or more network nodes of the on-premises network environment associated with the user or the network management system.

EI 7: The method of EI 5, further comprising: receiving a connection request from the one or more network nodes of the on premises network environment associated with the user, wherein the connection request is associated with a set of credentials usable to access a network infrastructure modernization service configured to generate the cloud infrastructure information; authorizing, based at least in part on the set of credentials associated with the connection request, the one or more network nodes of the on premises network environment to transmit the network node information to the network infrastructure modernization service; and receiving, by the network infrastructure modernization service, the network node information from the one or more network nodes of the on-premises network environment.

EI 8: The method of EI 5, further comprising outputting a visual representation of the cloud infrastructure template for user review and modification.

EI 9: The method of EI 5, further comprising: receiving, from a user computing device associated with the user, a modified version of the cloud infrastructure information; and deploying the cloud network infrastructure based at least in part on the modified version of the cloud infrastructure information.

EI 10: The method of EI 5, further comprising migrating one or more user applications onto the cloud network infrastructure.

EI 11: The method of EI 5, wherein the network node information comprises one or more of a security rule, a routing restriction, a network interface type, a network throughput, a port number, an Internet access rule, a redundancy rule, a Quality of Service (QoS) configuration, or a media access control (MAC) address.

EI 12: The method of EI 5, wherein the one or more network nodes of the on-premises network environment associated with the user comprise one or more of a computing device, a router, a switch, a gateway, or a load balancer.

EI 13: A non-transitory computer-readable medium storing instructions that, when executed by a computing system within a cloud provider network, cause the computing system to perform operations comprising: receiving network node information associated with one or more network nodes of an on-premises network environment associated with a user; generating a network model including the one or more network nodes of the on premises network environment associated with the user; generating, using one or more modernization rules, cloud infrastructure information indicating one or more cloud network nodes that correspond to the one or more network nodes of the on-premises network environment associated with the user, wherein the one or more modernization rules include mapping information usable to map the one or more network nodes of the on-premises network environment to the one or more corresponding cloud network nodes; and deploying a cloud network infrastructure associated with the user based at least in part on the cloud infrastructure information.

EI 14: The non-transitory computer-readable medium of EI 13, storing further instructions that, when executed by the computing system, cause the computing system to perform operations comprising: receiving, from a user computing device associated with the user, a set of credentials usable to access the one or more network nodes of the on-premises network environment associated with the user or a network management system associated with the one or more network nodes of the on-premises network environment associated with the user; and using the set of credentials, requesting the network node information from the one or more network nodes of the on-premises network environment associated with the user or the network management system.

EI 15: The non-transitory computer-readable medium of EI 13, storing further instructions that, when executed by the computing system, cause the computing system to perform operations comprising: receiving a connection request from the one or more network nodes of the on premises network environment associated with the user, wherein the connection request is associated with a set of credentials usable to access a network infrastructure modernization service configured to generate the cloud infrastructure information; authorizing, based at least in part on the set of credentials associated with the connection request, the one or more network nodes of the on premises network environment to transmit the network node information to the network infrastructure modernization service; and receiving, by the network infrastructure modernization service, the network node information from the one or more network nodes of the on-premises network environment.

EI 16: The non-transitory computer-readable medium of EI 13, storing further instructions that, when executed by the computing system, cause the computing system to perform operations comprising outputting a visual representation of the cloud infrastructure template for user review and modification.

EI 17: The non-transitory computer-readable medium of EI 13, storing further instructions that, when executed by the computing system, cause the computing system to perform operations comprising: receiving, from a user computing device associated with the user, a modified version of the cloud infrastructure information; and deploying the cloud network infrastructure based at least in part on the modified version of the cloud infrastructure information.

EI 18: The non-transitory computer-readable medium of EI 13, storing further instructions that, when executed by the computing system, cause the computing system to perform operations comprising migrating one or more user applications onto the cloud network infrastructure.

EI 19: The non-transitory computer-readable medium of EI 13, wherein the network node information comprises one or more of a security rule, a routing restriction, a network interface type, a network throughput, a port number, an Internet access rule, a redundancy rule, a Quality of Service (QoS) configuration, or a media access control (MAC) address.

EI 20: The non-transitory computer-readable medium of EI 13, wherein the one or more network nodes of the on-premises network environment associated with the user comprise one or more of a computing device, a router, a switch, a gateway, or a load balancer.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

The processes described herein or illustrated in the figures of the present disclosure may begin in response to an event, such as on a predetermined or dynamically determined schedule, on demand when initiated by a user or system administrator, or in response to some other event. When such processes are initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, such processes or portions thereof may be implemented on multiple computing devices and/or multiple processors, serially or in parallel.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. All changes which come within the meaning and range of equivalency of the EIs are to be embraced within their scope.

What is claimed is:

1. A system comprising:
a compute service implemented at least partially by a set of physical machines comprising compute capacity configured for hosting a plurality of compute instances usable to execute user applications; and
a network infrastructure modernization service comprising computer hardware and in network communication with one or more network nodes of an on-premises network environment associated with a user, wherein the network infrastructure modernization service is configured to at least:
receive, from a user computing device associated with the user, a set of node credentials usable to access the one or more network nodes of the on-premises network environment associated with the user;
access, using the set of node credentials, network node information associated with the one or more network nodes of the on-premises network environment associated with the user;
generate a network model including the one or more network nodes of the on-premises network environment associated with the user;
generate, using one or more modernization rules, a cloud infrastructure template including one or more cloud network nodes that correspond to the one or more network nodes of the on-premises network environment associated with the user; and
deploy, in the compute service, a cloud network infrastructure associated with the user based at least in part on a modified version of the cloud infrastructure template.

2. The system of claim 1, wherein the network infrastructure modernization service is further configured to output a visual representation of the cloud infrastructure template for user review and modification.

3. The system of claim 2, wherein the visual representation of the cloud infrastructure template includes a corresponding graphical representation for each of (i) the one or more network nodes of the on-premises network environment or (ii) the one or more corresponding cloud network nodes.

4. The system of claim 1, wherein the network infrastructure modernization service is further configured to cause one or more of the user applications to be migrated onto the cloud network infrastructure.

5. A computer-implemented method comprising:
receiving a connection request from one or more network nodes of an on-premises network environment associated with a user, wherein the connection request is associated with a set of credentials usable to access a network infrastructure modernization service configured to generate cloud infrastructure information indicating one or more cloud network nodes that correspond to the one or more network nodes of the on-premises network environment associated with the user;
authorizing, based at least in part on the set of credentials associated with the connection request, the one or more network nodes of the on-premises network environment to transmit the network node information to the network infrastructure modernization service;
receiving, by the network infrastructure modernization service, network node information associated with one or more network nodes of the on-premises network environment associated with the user;
generating a network model including the one or more network nodes of the on-premises network environment associated with the user;
generating, using one or more modernization rules, the cloud infrastructure information, wherein the one or more modernization rules include mapping information usable to map the one or more network nodes of the on-premises network environment to the one or more corresponding cloud network nodes; and
deploying a cloud network infrastructure associated with the user based at least in part on the cloud infrastructure information.

6. The method of claim 5, further comprising:
receiving, from a user computing device associated with another user, a set of credentials usable to access one or more network nodes of another on-premises network environment associated with said another user or a network management system associated with the one or more network nodes of said another on-premises network environment associated with said another user; and
using the set of credentials, requesting the network node information from the one or more network nodes of said another on-premises network environment associated with said another user or the network management system.

7. The method of claim 5, further comprising outputting a visual representation of the cloud infrastructure information user review and modification.

8. The method of claim 7, wherein the visual representation of the cloud infrastructure information includes a corresponding graphical representation for each of (i) the one or more network nodes of the on-premises network environment or (ii) the one or more corresponding cloud network nodes.

9. The method of claim 5, further comprising:
receiving, from a user computing device associated with the user, a modified version of the cloud infrastructure information; and
deploying the cloud network infrastructure based at least in part on the modified version of the cloud infrastructure information.

10. The method of claim 5, further comprising migrating one or more user applications onto the cloud network infrastructure.

11. The method of claim 5, wherein the network node information comprises one or more of a security rule, a routing restriction, a network interface type, a network throughput, a port number, an Internet access rule, a redundancy rule, a Quality of Service (QoS) configuration, or a media access control (MAC) address.

12. The method of claim 5, wherein the one or more network nodes of the on-premises network environment associated with the user comprise one or more of a computing device, a router, a switch, a gateway, or a load balancer.

13. A non-transitory computer-readable medium storing instructions that, when executed by a computing system within a cloud provider network, cause the computing system to perform operations comprising:
receiving a connection request from one or more network nodes of an on-premises network environment associated with a user, wherein the connection request is associated with a set of credentials usable to access a network infrastructure modernization service configured to generate cloud infrastructure information indicating one or more cloud network nodes that correspond to the one or more network nodes of the on-premises network environment associated with the user;

authorizing, based at least in part on the set of credentials associated with the connection request, the one or more network nodes of the on-premises network environment to transmit the network node information to the network infrastructure modernization service;

receiving, by the network infrastructure modernization service, network node information associated with one or more network nodes of the on-premises network environment associated with the user;

generating a network model including the one or more network nodes of the on-premises network environment associated with the user;

generating, using one or more modernization rules, the cloud infrastructure information, wherein the one or more modernization rules include mapping information usable to map the one or more network nodes of the on-premises network environment to the one or more corresponding cloud network nodes; and deploying a cloud network infrastructure associated with the user based at least in part on the cloud infrastructure information.

14. The non-transitory computer-readable medium of claim 13, storing further instructions that, when executed by the computing system, cause the computing system to perform operations comprising:

receiving, from a user computing device associated with another user, a set of credentials usable to access one or more network nodes of another on-premises network environment associated with said another user or a network management system associated with the one or more network nodes of said on-premises network environment associated with said another user; and using the set of credentials, requesting the network node information from the one or more network nodes of said another on-premises network environment associated with said another user or the network management system.

15. The non-transitory computer-readable medium of claim 13, storing further instructions that, when executed by the computing system, cause the computing system to perform operations comprising outputting a visual representation of the cloud infrastructure information user review and modification.

16. The non-transitory computer-readable medium of claim 15, wherein the visual representation of the cloud infrastructure information includes a corresponding graphical representation for each of (i) the one or more network nodes of the on-premises network environment or (ii) the one or more corresponding cloud network nodes.

17. The non-transitory computer-readable medium of claim 13, storing further instructions that, when executed by the computing system, cause the computing system to perform operations comprising:

receiving, from a user computing device associated with the user, a modified version of the cloud infrastructure information; and deploying the cloud network infrastructure based at least in part on the modified version of the cloud infrastructure information.

18. The non-transitory computer-readable medium of claim 13, storing further instructions that, when executed by the computing system, cause the computing system to perform operations comprising migrating one or more user applications onto the cloud network infrastructure.

19. The non-transitory computer-readable medium of claim 13, wherein the network node information comprises one or more of a security rule, a routing restriction, a network interface type, a network throughput, a port number, an Internet access rule, a redundancy rule, a Quality of Service (QoS) configuration, or a media access control (MAC) address.

20. The non-transitory computer-readable medium of claim 13, wherein the one or more network nodes of the on-premises network environment associated with the user comprise one or more of a computing device, a router, a switch, a gateway, or a load balancer.

* * * * *